(12) United States Patent
Hamilton (10) Patent No.: US 10,304,109 B2
(45) Date of Patent: May 28, 2019

(54) POD SYSTEM FOR HOUSEBOAT ASSEMBLY

(71) Applicant: Harbor Cottage, LLC, Nancy, KY (US)

(72) Inventor: James DeSales Hamilton, Nancy, KY (US)

(73) Assignee: Harbor Cottage, LLC, Nancy, KY (US)

( * ) Notice: Subject to any disclaimer, the term of this patent is extended or adjusted under 35 U.S.C. 154(b) by 28 days.

(21) Appl. No.: 15/639,503

(22) Filed: Jun. 30, 2017

(65) Prior Publication Data

US 2018/0001982 A1   Jan. 4, 2018

Related U.S. Application Data

(60) Provisional application No. 62/357,003, filed on Jun. 30, 2016.

(51) Int. Cl.
| | |
|---|---|
| *B63B 9/06* | (2006.01) |
| *G06Q 30/06* | (2012.01) |
| *B63B 35/73* | (2006.01) |
| *B63H 20/08* | (2006.01) |

(52) U.S. Cl.
CPC ....... *G06Q 30/0621* (2013.01); *B63B 35/732* (2013.01); *B63H 20/08* (2013.01); *G06Q 30/0643* (2013.01); *B63B 9/06* (2013.01); *Y02A 30/21* (2018.01)

(58) Field of Classification Search
CPC ...... G06Q 30/0621; B63B 35/732; B63B 9/06
See application file for complete search history.

(56) References Cited

U.S. PATENT DOCUMENTS

| | | | | |
|---|---|---|---|---|
| 5,255,625 A | * | 10/1993 | Hattori .................. | B63B 35/665 114/248 |
| 5,775,250 A | * | 7/1998 | Kobayashi .............. | B63B 35/70 114/258 |
| 6,035,796 A | * | 3/2000 | Vowels ................. | B63B 35/665 114/248 |
| 9,428,252 B1 | * | 8/2016 | Brown ..................... | B63B 21/62 |
| 2005/0064768 A1 | * | 3/2005 | Lowe ...................... | B60L 11/02 440/6 |
| 2011/0247538 A1 | * | 10/2011 | Gimbel ................. | B60P 3/1033 114/61.1 |

* cited by examiner

*Primary Examiner* — Stephen P Avila
(74) *Attorney, Agent, or Firm* — Frost Brown Todd LLC (57) ABSTRACT

A pod system for use with a houseboat assembly is disclosed herein, with the pod system comprising a first pod and a second pod. The first pod and the second pod are configured to be selectively disposed in a pod slot defined by the houseboat assembly. The first pod is generally free of any locomotive capabilities, while the second pod includes a movement element. When the second pod is disposed in the pod slot, the movement element may be actuated from a helm of the houseboat assembly to impart locomotive capabilities to the houseboat assembly. When locomotive capabilities are not desired, the second pod may be replaced by the first pod in the pod slot. Connectors are provided on the houseboat assembly, first pod, and second pod to removably secure the first pod and the second pod in the pod slot as desired.

9 Claims, 11 Drawing Sheets

POD SYSTEM FOR HOUSEBOAT ASSEMBLY

BACKGROUND

Conventional houseboats are manufactured with an integrated engine or motor for enabling movement of the houseboat on the water. However, many houseboat owners frequently choose to remain at the dock for a majority of the boating season, rarely if ever taking the houseboat out on open water. Yet the engine or motor represents a significant portion of the overall cost of a houseboat. Therefore, in some instances, it may be desirable to provide a pod system for a houseboat assembly.

The pod system may comprise a pod slot defined by the houseboat assembly and sized to selectively receive either a first pod or a second pod therein, as determined by the immediate need of the user. The first pod may be considered a "placeholder pod" type of element, configured to fill the void of the pod slot and prevent a user from falling into the empty pod slot. The second pod may be considered an "movement pod" type of element. The movement pod may include an engine or motor and may be controlled by a helm on the houseboat assembly. The movement pod may be rented or otherwise temporarily obtained by the houseboat assembly owner for use in moving the houseboat assembly as desired and thereafter returned to the proper owner of the movement pod. The placeholder pod may be free of an engine and motor and may be used to complete the profile of the hull and cabin assembly and "fill in" the pod slot when an engine is not needed. Inasmuch as the placeholder pod does not include an engine or motor, the placeholder pod is significantly less expensive than the movement pod. This allows the user to purchase a houseboat assembly and a placeholder pod and realize a significant cost savings. On the rare occasions where the houseboat assembly owner desires to move the houseboat assembly away from the dock and into open water, the user may simply rent or borrow an movement pod and swap the movement pod for the placeholder pod for this short time or until no longer desired.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

It will be appreciated that any one or more of the teachings, expressions, versions, examples, etc. described herein may be combined with any one or more of the other teachings, expressions, versions, examples, etc. that are described herein. The following-described teachings, expressions, versions, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

I. Exemplary Pod System

An exemplary pod system (1) for a houseboat assembly (3) is shown and described in FIGS. 1-12. Some versions of houseboat assembly (3) include a hull assembly (5) and a cabin assembly (7), as described in U.S. Ser. No. 15/637,678, filed on Jun. 29, 2017, and incorporated herein by reference and U.S. Ser. No. 15/637,508, filed on Jun. 29, 2017, and incorporated herein by reference.

Figure 1:
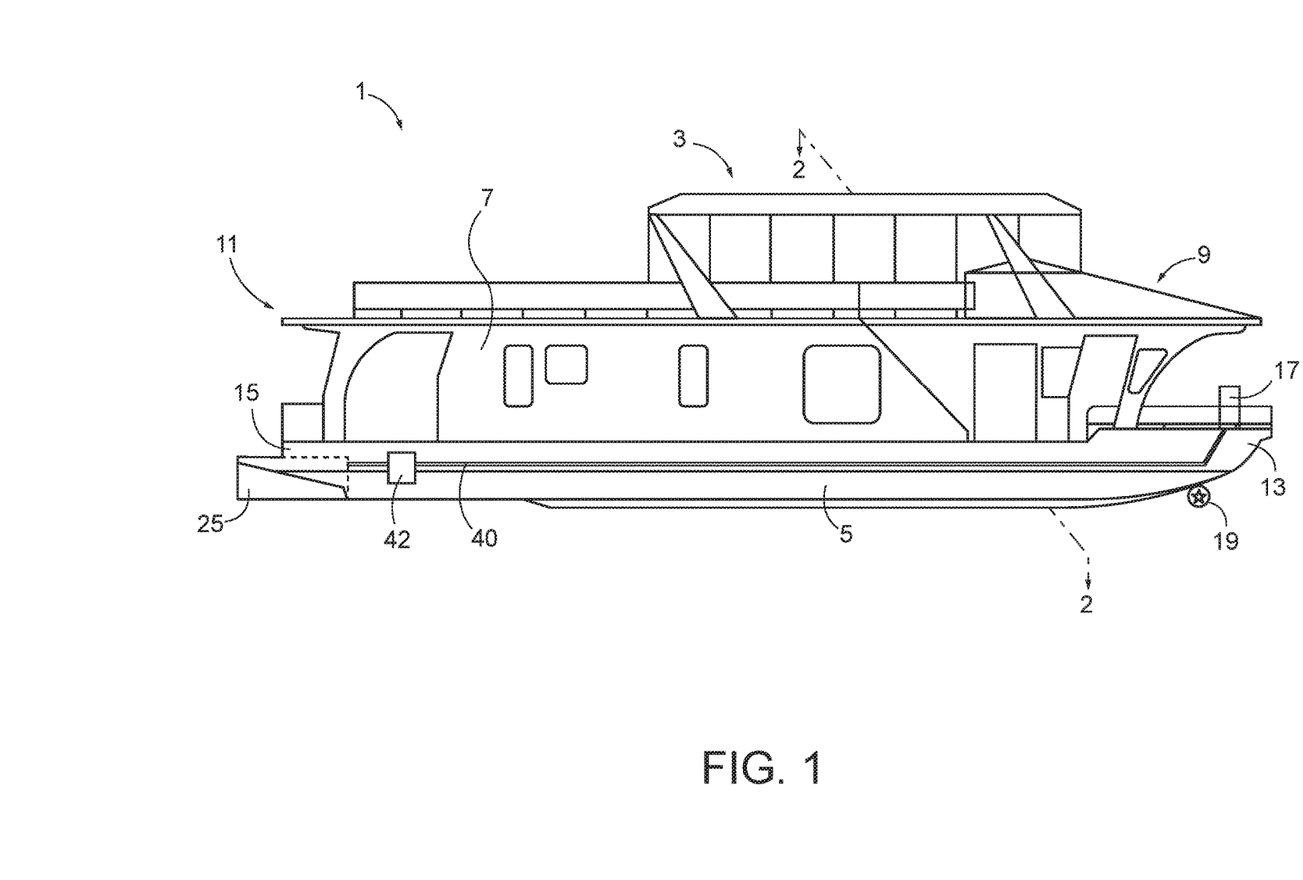
FIG. 1 depicts a side elevational view of an exemplary houseboat assembly incorporating an exemplary pod system.

Houseboat assembly (3) extends from a fore area (9) to an aft area (11) and may include various common houseboat features disposed therein, including a living room, kitchen, and bedroom areas. Houseboat assembly (3) further includes bow (13), a stern (15), and a helm (17). Helm (17) includes various controls such as a wheel (not shown) or knobs (not shown) or any other associated equipment or controls for actuating or controlling various features of houseboat assembly (3). While helm (17) is shown and described as proximate bow (13), helm (17) may be located anywhere along houseboat assembly (3) or several helms (17) may be provided.

Figure 2:
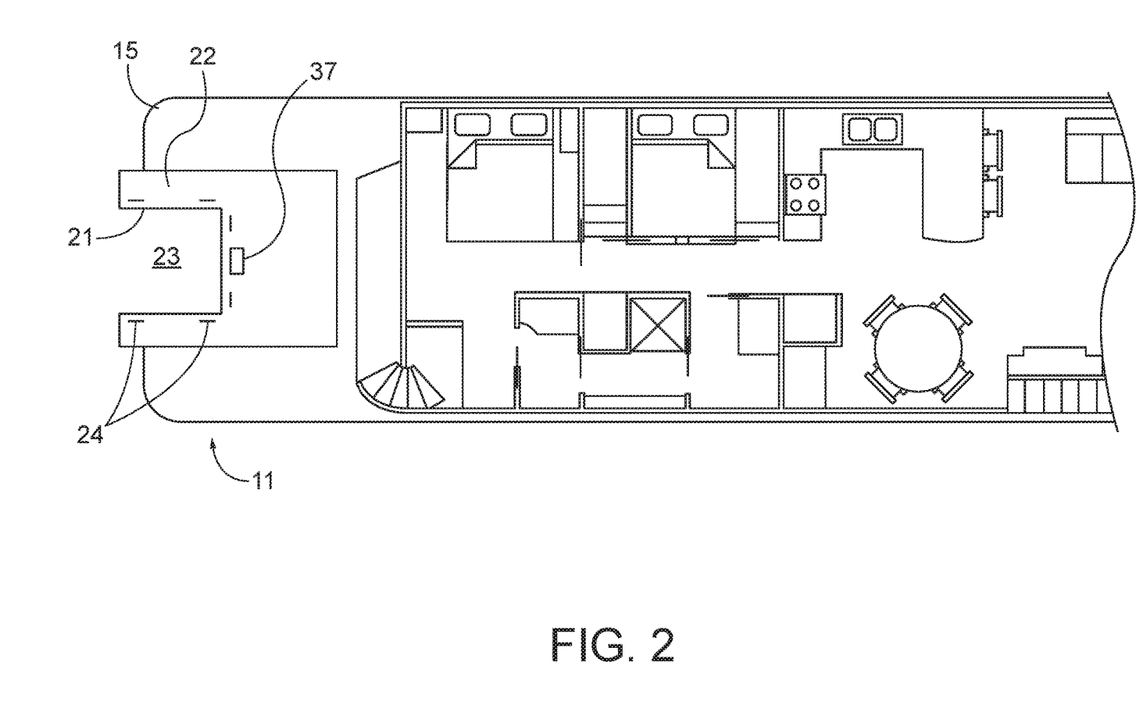
FIG. 2 depicts a partial top cross-sectional view of the houseboat assembly of FIG. 1 taken along line 2-2 of FIG. 1.

Houseboat assembly (3) further includes a bow thruster (19) located proximate bow (13). Bow thruster (19) is controllable via helm (17) and operatively coupled therewith. As shown in FIG. 2, houseboat assembly (3) includes a peripheral side surface (21) and a peripheral top surface (22) that cooperate to define a pod slot (23) in aft area (11). A plurality of connectors (24) are disposed around peripheral top surface (22) of aft area (11).

i. First Pod

Figure 3:
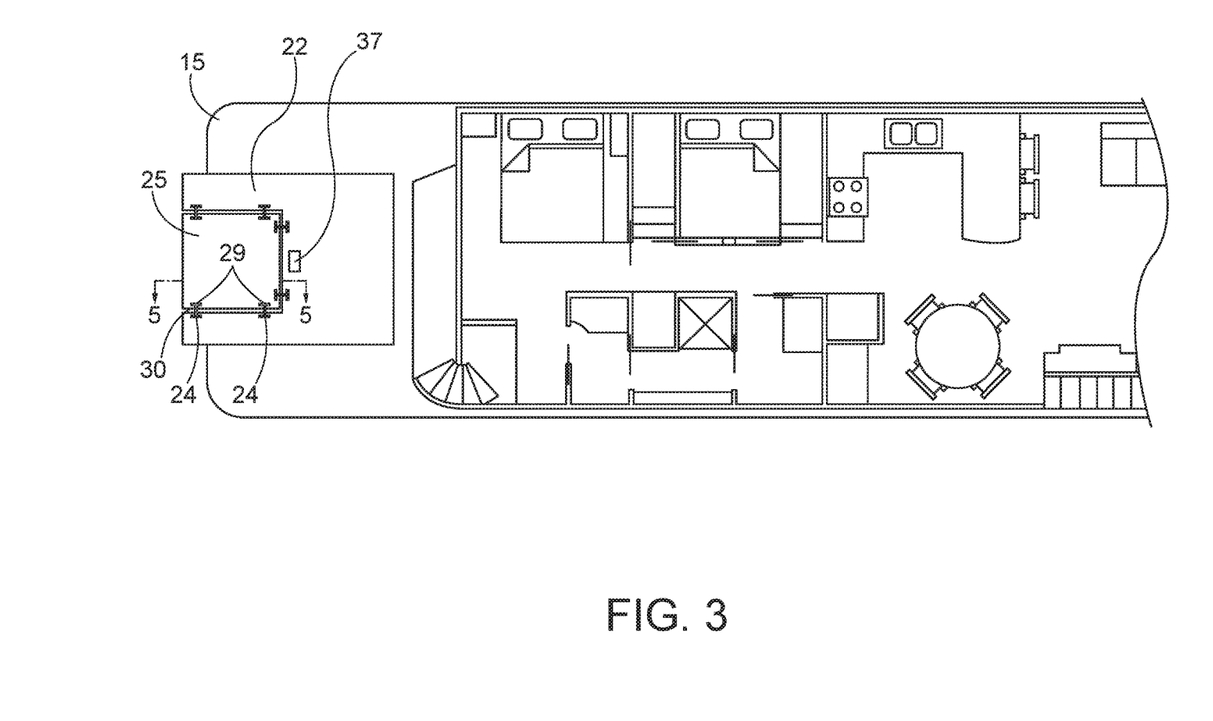
FIG. 3 depicts a view similar to FIG. 2 with a first pod disposed in a pod slot defined by the houseboat assembly.
Figure 5:
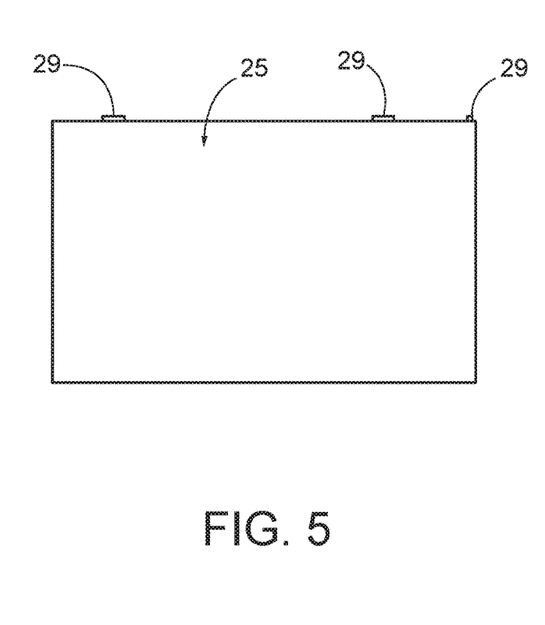
FIG. 5 depicts a cross-sectional view of the first pod of FIG. 3, taken along line 5-5 of FIG. 3.
Figure 6:
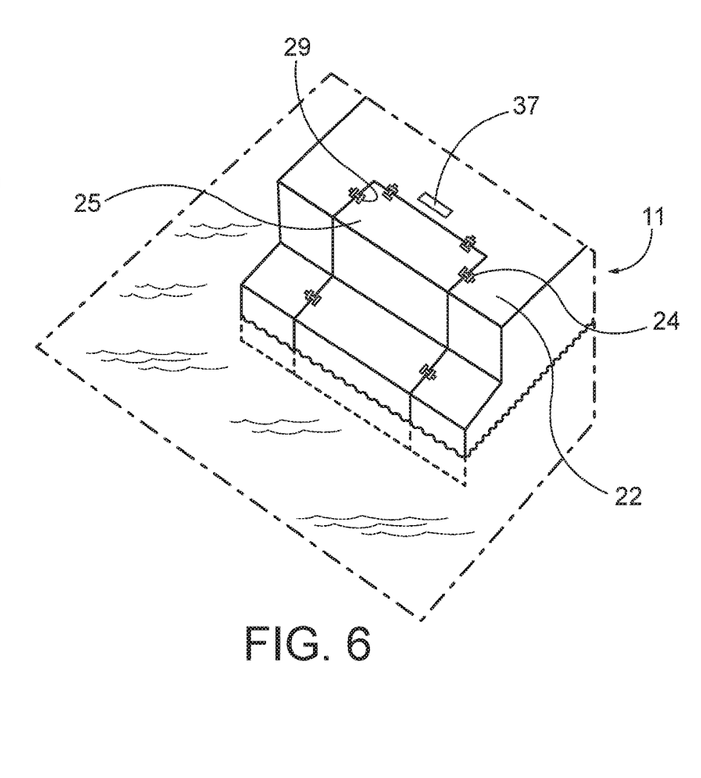
FIG. 6 depicts a rear perspective view of another exemplary houseboat assembly and another exemplary first pod similar to FIG. 3.

As shown in FIGS. 3, 5, 6, pod slot (23) is sized and configured to selectively receive a first pod (25) therein. First pod (25) includes a plurality of connectors (29) oriented and configured to selectively connect with plurality of connectors (24) disposed around peripheral top surface (22). Connectors (24) and connectors (29) engage and cooperate to removably secure first pod (25) within pod slot (23). In some versions of pod system (1), connectors (24) and connectors (29) may take the form of brackets with each bracket defining a channel therein. A removable element such as a cotter pin (30) may be used to slide through each channel and removably secure first pod (25) within pod slot (23). In some versions of pod system (1), each cotter pin (30) extends from a wire (not shown) or other elongated element having an end secured to either the associated connector (24) or peripheral top surface (22) to prevent cotter pin (30) from being lost overboard or misplaced. Cotter pins (30) may be a sufficient gauge to allow one or more users to stand on first pod (25) without disconnecting first pod (25) from pod slot (23) or breaking any one of connectors (24), connectors (29), or cotter pins (30).

Figure 12:
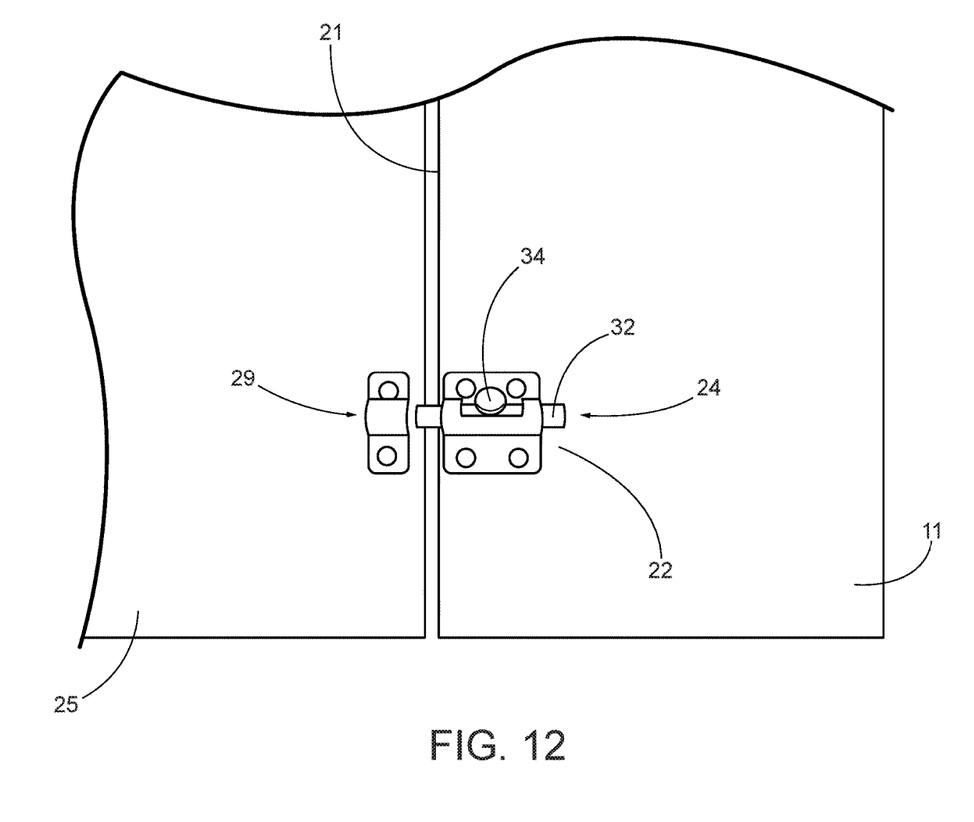
FIG. 12 depicts a top perspective view of an exemplary sliding bolt for use in the pod system.

As shown in FIG. 12, rather than cotter pins (30), some versions of pod system (1) may include a removable element such a sliding bolt (32) incorporated with connectors (24). Sliding bolts (32) may be moved to engage connectors (29) of first pod (25) to removably secure first pod (25) within pod slot (23). In some versions, each sliding bolt (32) is connected to a knob (34) or a ring such as a "D-ring" (not shown) to actuate the movement of sliding bolt (32). Connectors (24) may include a recess or stepped portion to allow each D-ring to recess into aft area (11) of houseboat assembly (3) when not in use to prevent tripping on the rings by a user.

First pod (25) is configured to act as a placeholder or void filling element for pod slot (23). First pod (25) is configured to float on water to allow a user to manually push or pull first pod (25) while it floats on the water surrounding houseboat assembly (3).

In some embodiments of first pod (25), the overall profile of first pod (25) is configured to match the profile of aft area (11) surrounding peripheral side surface (21) and peripheral top surface (22). For example, if a portion of aft area (11) is stepped or angled, first pod (25) may include a matching stepped or angled profile to incorporate first pod (25) into aft area (11). In some embodiments of first pod (25), aft area (11) includes a surface profile and first pod (25) includes a matching surface profile.

As shown in FIG. 6, some versions of first pod (25) may include a stepped profile for complementing the profile of pod slot (23) and aft area (11). A subset of connectors (29) may be disposed on different levels of first pod (25) to engage with similarly disposed connectors (24) on peripheral top surface (22). By forming first pod (25) to have a complementing profile with respect to aft area (11), a smooth continuous aft area (11) surface is provided to the user with minimal obstructions or severe changes in relative heights between first pod (25) and aft area (11).

ii. Second Pod

Figure 4:
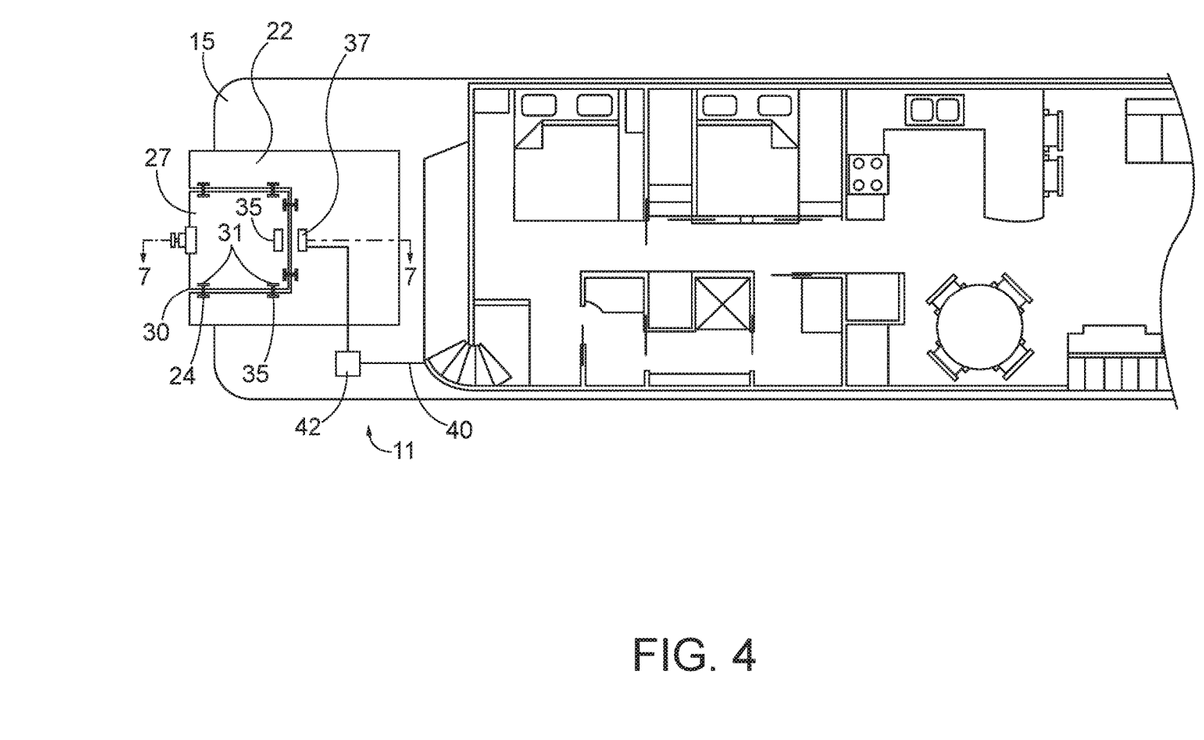
FIG. 4 depicts a view similar to FIG. 2 with a second pod disposed in the pod slot of the houseboat assembly.

As shown in FIG. 4, pod system (1) includes a second pod (27). Second pod (27) is similar in most respect to first pod (25). Second pod (27) is configured to float on water and may include a profile configured to match or complement the profile of aft area (11). Second pod (27) includes a plurality of connectors (31) oriented and configured to selectively connect with connectors (24) disposed around peripheral top surface (22). Similar to connectors (29) of first pod (25), connectors (24) and connectors (31) engage to removably secure second pod (27) within pod slot (23). In some versions of pod system (1), connectors (24) and connectors (31) may take the form of brackets with each bracket defining a channel therein. A removable element such as the aforementioned cotter pin (30), sliding bolt (32), or D-rings may be used to slide through each channel and removably secure second pod (27) within pod slot (23).

When disposed within pod slot (23), second pod (27) is configured to provide locomotive or movement capabilities to houseboat assembly (3) via a movement element (33), controlled through a pod control element (35). Pod control element (35) is configured to connect with a corresponding houseboat control element (37) provided by houseboat assembly (3) within aft area (11). Pod control element (35) and houseboat control element (37) communicate to allow a user to manipulate movement element (33) from helm (17) and in turn manipulate the movement of houseboat assembly (3).

As shown in FIGS. 1, 4, and 7-9, one or more electrical and/or mechanical wires (39) extend from pod control element (35) to movement element (33). Similarly, as shown in FIG. 1, a series of electrical and/or mechanical wires (40) extend from houseboat control element (37) to helm (17). When second pod (27) is secured in pod slot (23) and pod control element (35) is connected to houseboat control element (37), actuation commands initiated through helm (17) are transmitted through wires (40) to wires (39) and on to movement element (33) to manipulate various features of movement element (33). Thus, helm (17) may be used to pilot houseboat assembly (3) and to transfer control information between helm (17) and movement element (33).

Figure 7:
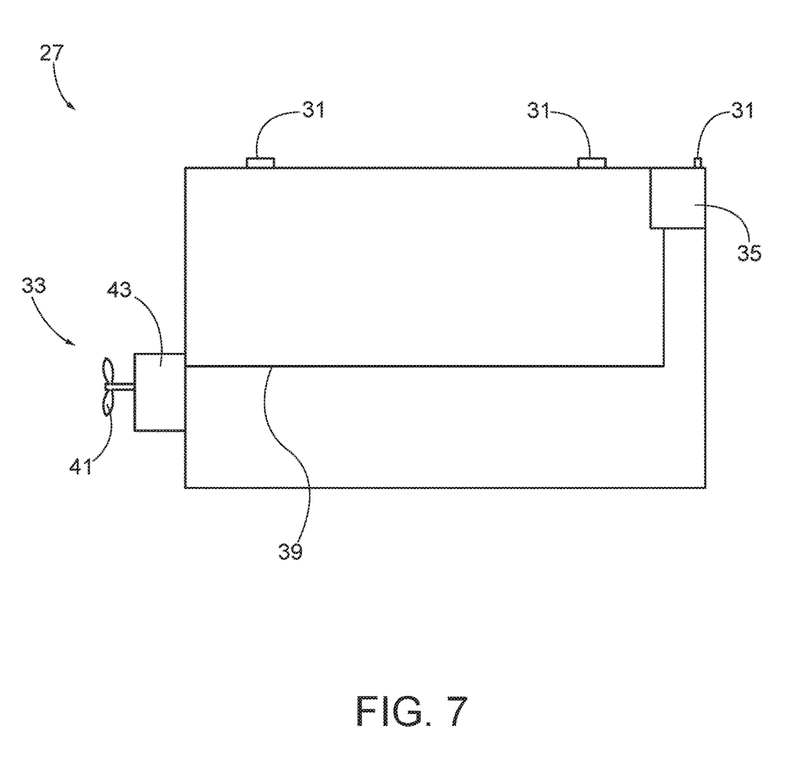
FIG. 7 depicts a cross-sectional view of the second pod of FIG. 4, taken along line 7-7 of FIG. 4.

As shown in FIG. 7, some versions of movement element (33) may comprise a propeller (41) connected to a motor (43), whereby motor (43) is configured to receive control information through wires (39) and actuate propeller (41) accordingly to provide forward and reverse thrust to houseboat assembly (3). As shown in FIGS. 1 and 7, some versions of movement element (33) may be powered through wires (39, 40) from a power source (42) located within houseboat assembly (3). Power source (42) of houseboat assembly (3) may be a battery or a gas or diesel powered generator or any other element for providing power to movement element (33) through wires (39, 40).

Figure 8:
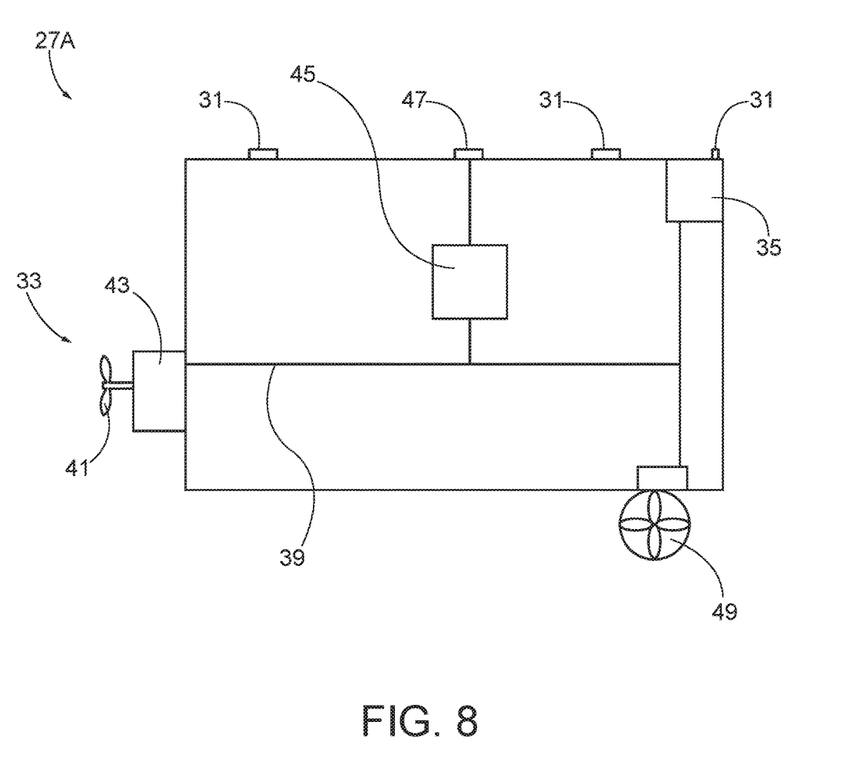
FIG. 8 depicts a cross-sectional view of another exemplary second pod, similar to the second pod depicted in FIG. 7.

In some versions of second pod (27), shown in FIG. 8 as second pod (27A), movement element (33) may be powered through wires (39) from a power source (45) located within second pod (27). Power source (45) may be in the form of a battery or a gas or diesel powered generator or any other element for providing power to movement element (33). Some versions of power source (45) include a single use battery, while other versions of power source (45) include a rechargeable battery. A recharging mechanism (47) such as a plug, outlet, or receptacle may be provided to receive electrical power and recharge power source (45) from an outside source. Alternatively, recharging mechanism (47) may be embodied in a solar panel for charging power source (45) through solar power.

In some versions of second pod (27, 27A), movement element (33) may further include a stern thruster (49) having a propeller (50). In some embodiments of movement element (33), the general orientation of propeller (50) is perpendicular to the orientation of propeller (41). Similar to propeller (41), stern thruster (49) may be powered via power source (42) located within houseboat assembly (3) or power source (45) located within second pod (27) and actuated via wires (39, 40) from helm (17) to provide lateral thrust to houseboat assembly (3).

Figure 9:
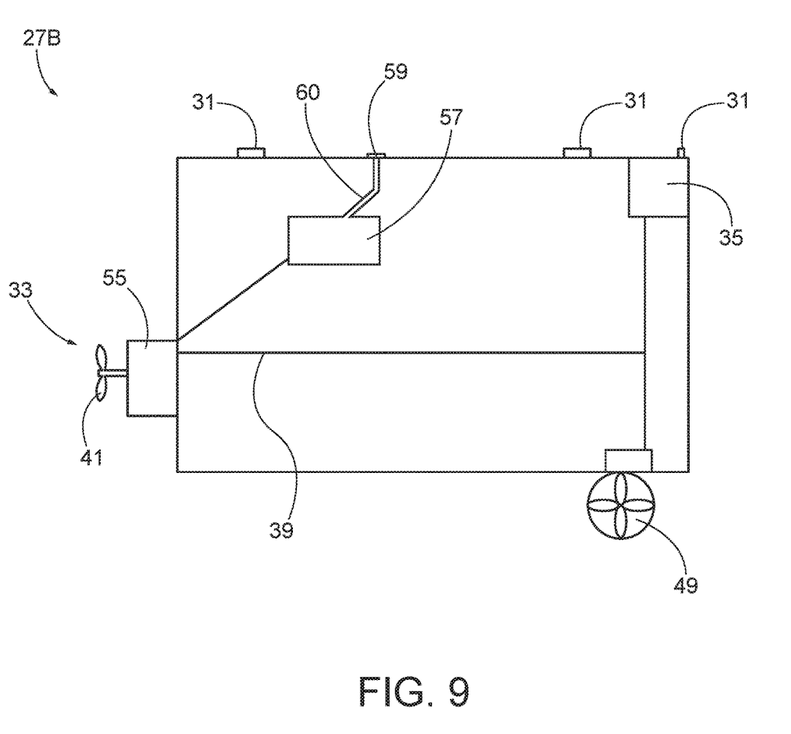
FIG. 9 depicts a cross-sectional view of yet another exemplary second pod, similar to the second pod depicted in FIG. 7.

In some versions of second pod (27), shown in FIG. 9 as second pod (27B), rather than a motor (43), a gas or diesel powered engine (55) with an associated fuel tank (47) may be provided for powering propeller (41) and/or stern thruster (49). Engine (55) burns the fuel from fuel tank (57) to provide mechanical rotary motion to propeller (41). Fuel tank (47) may be filled with gas or diesel or any other fuel by removing a cap (59) disposed on a surface of second pod (27B) to reveal a channel (60) extending to fuel tank (47).

II. Exemplary Method of Using Pod System

As shown in FIGS. 2-4, 10, and 11, pod system (1) may facilitate the selective swapping between first pod (25) and second pod (27) within pod slot (23) as desired by the user. Swapping first pod (25) for second pod (27) proceeds as follows. First, the user disconnects first pod (25) from pod slot (23) of aft area (11) by decoupling connectors (29) of first pod (25) from connectors (24) of houseboat assembly (3). This releases first pod (25) from the secure connection with houseboat assembly (3) and allows first pod (25) to move freely and independently away from pod slot (23) of houseboat assembly (3). Thereafter, the user manually moves first pod (25) out of pod slot (23) in the direction of Arrow A depicted in FIG. 10. Inasmuch as first pod (25) is configured to float on water, first pod (25) may be moved by pushing or pulling the floating first pod (25) away from houseboat assembly (3) to another area. Once pod slot (23) is empty and free of first pod (25), second pod (27) may then be moved into pod slot (23) by pushing or pulling the floating second pod (25) into pod slot (23).

Figure 10:
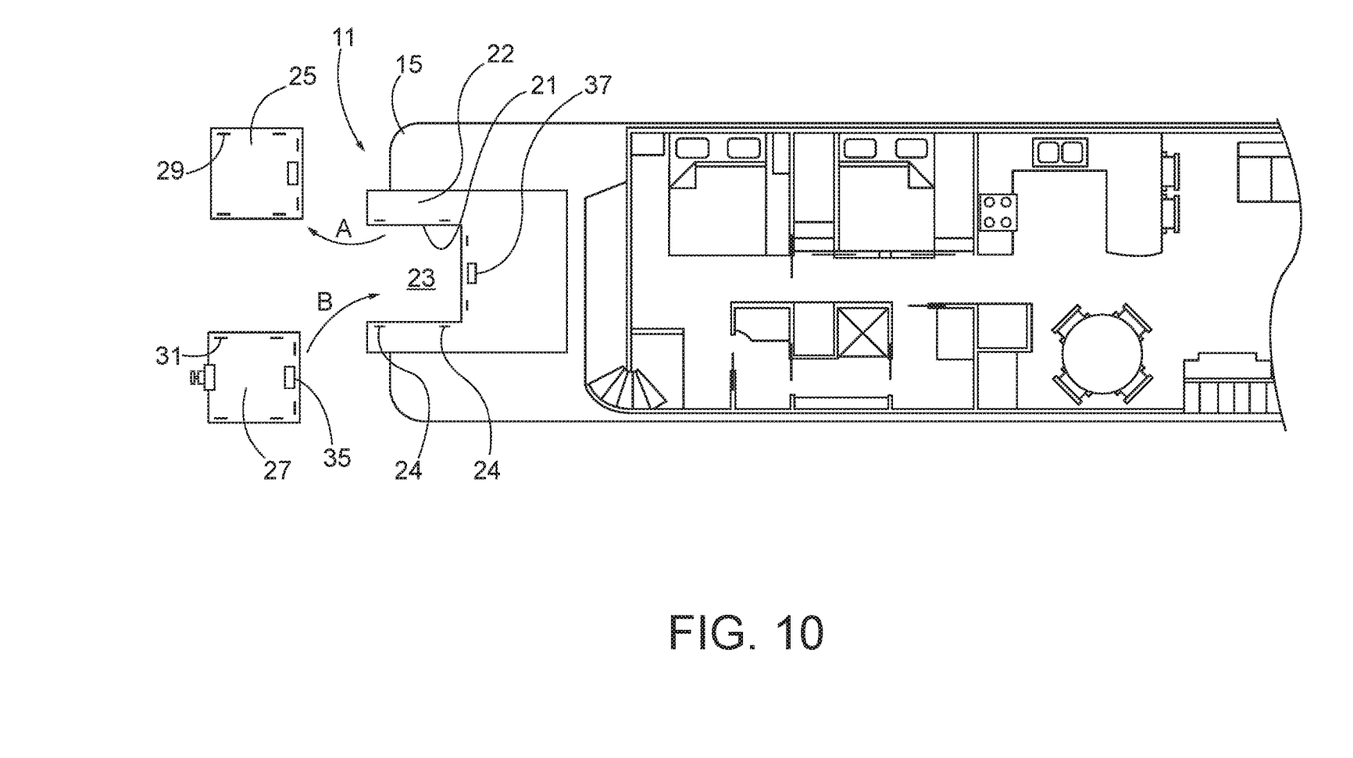
FIG. 10 depicts a partial top cross-sectional view similar to FIGS. 2-4, with first pod moving out of the pod slot of the houseboat assembly and the second pod moving into the pod slot.

Once second pod (27) is disposed within pod slot (23), connectors (31) of second pod (27) are connected to connectors (24) of houseboat assembly (3) to secure second pod (27) to houseboat assembly (3). In some versions of pod system (1), the aforementioned cotter pins (30), sliding bolts (32), other elements may be used to secure second pod (27) to houseboat assembly (3) by way of connectors (24, 31). Once second pod (27) is secured to houseboat assembly (3), pod control element (35) of second pod (27) is connected to houseboat control element (37) of houseboat assembly (3) to enable communications and link helm (17) with second pod (27). Thereafter, a user of houseboat assembly (3) may manipulate helm (17) to control various actions of second pod (27). Helm (17) may be used to actuate propeller (50) to move houseboat assembly (3) forward or reverse as desired. Helm (17) may also be configured to actuate both bow thruster (19) and stern thruster (49) to move houseboat assembly (3) laterally as desired, either simultaneously or independently.

With locomotive or movement capabilities provided through second pod (27), a user may travel away from a dock or other area under the power of houseboat assembly (3) by way of second pod (27). Once locomotive or movement capabilities are no longer required by houseboat assembly (3), second pod (27) may be removed from pod slot (23) by reversing the previously described steps and moving second pod (27) away from houseboat assembly (3). First pod (25) may then be placed into pod slot (23) to fill the void of pod slot (23).

Houseboat owners typically spend a large portion of time at a dock or slip enjoying the houseboat. Inasmuch as a motor or engine represents a large portion of the cost of purchasing a houseboat, manufacturers may produce and sell houseboats similar to houseboat assembly (3) with pod slot (23) formed in aft area (11). Customers may then purchase an engine-less or motor-less houseboat assembly (3) for use at a dock or other stationary location for a lower overall cost. When the owner of houseboat assembly (3) desires to move houseboat assembly (3) from the dock or other stationary location, an embodiment of second pod (27) owned by the waterfront community or marina may be borrowed or rented to temporarily provide locomotive capabilities to houseboat assembly (3). The renting of second pod (27) by a marina may be an additional revenue stream or an additional benefit of renting a slip or dock at that particular marina or waterfront community.

Figure 11:
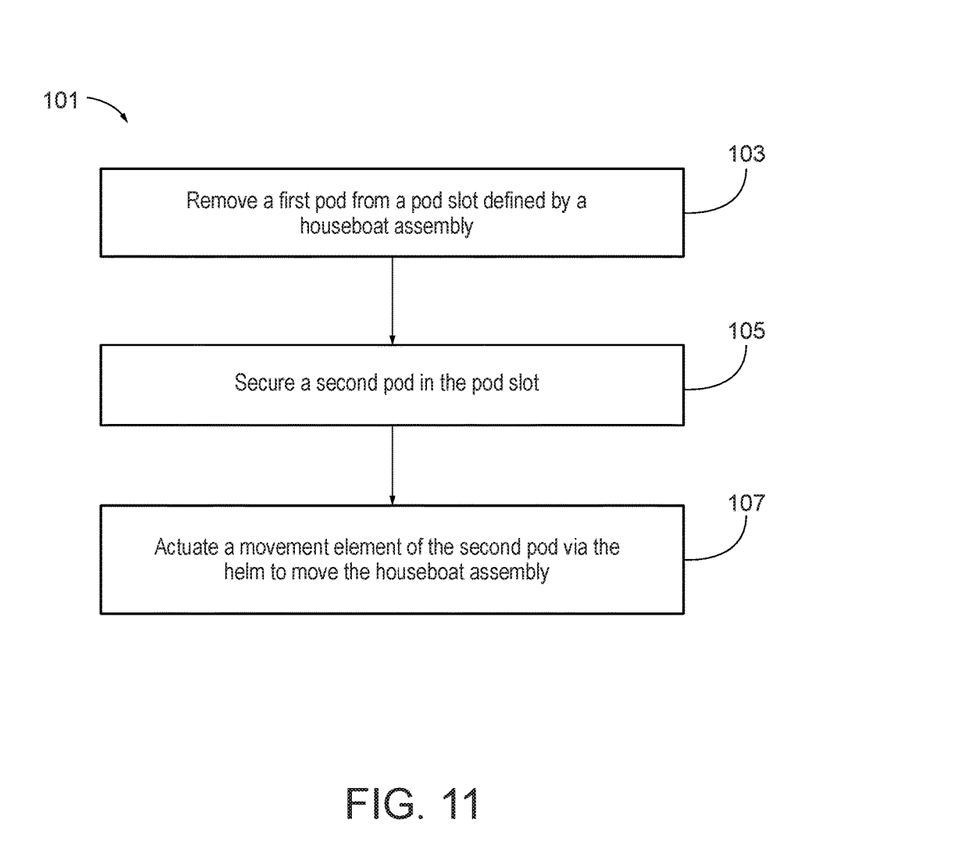
FIG. 11 depicts a flowchart for an exemplary method of the pod system.

An exemplary method (101) is depicted in FIG. 11 and begins with a step (103).

In step (103), a first pod is removed from a pod slot of a houseboat assembly. The first pod, pod slot, and houseboat assembly are similar to first pod (25), pod slot (23), and houseboat assembly (3) described above. To remove the first pod from the pod slot, a series of connectors disposed on one or both of the first pod and the houseboat assembly are disconnected to release the first pod from the houseboat assembly. Thereafter the first pod is free to move out of the pod slot, leaving pod slot empty and able to receive another pod type of element as desired.

Once the first pod is removed from the pod slot, step (103) moves to a step (105). In step (105), a second pod is secured in the pod slot. The second pod is similar to second pod (27) described above. To secure the second pod in the pod slot, a series of connectors disposed on one or both of the second pod and the houseboat assembly are engaged to connect the second pod to the houseboat assembly and secure the second pod in the pod slot. Further, a control connector of the second pod may be connected with a control connector of the houseboat assembly to enable communication between a helm of the houseboat assembly and the second pod. Communication between the helm and the second pod may be facilitated through mechanical elements such as pulling or pushing a wire. Alternatively, communication may be facilitated through electronic transmissions along the wire between the helm and the second pod.

After the second pod is secured in the pod slot, step (105) moves to a step (107). In step (107), a movement element of the second pod is actuated via a helm of the houseboat. Movement element and helm are similar to movement element (33) and helm (17) as described above.

Method (101) may include further steps or sub-steps such as connecting the helm of the houseboat with the movement element when the second pod is secured in the pod slot or manipulating the helm to actuate the movement element of the second pod. In those versions of method (101) where movement element includes a stern thruster, method (101) may include manipulating the helm to simultaneously actuate the stern thruster and a bow thruster of the houseboat.

III. Exemplary Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

EXAMPLE 1

A houseboat assembly comprising: a helm; a pod slot, wherein the pod slot is defined by an aft area of the houseboat assembly, wherein the pod slot is configured to selectively receive a pod therein; a connector proximate the pod slot, wherein the connector is configured to mechanically connect with the pod to secure the pod in the pod slot; and a control element proximate the pod slot, wherein the control element is configured to connect with the pod to facilitate communication between the helm and the pod.

EXAMPLE 2

The houseboat assembly of any one of the previous or following Examples, further comprising a power source, wherein the power source is configured to power a movement element of the pod.

EXAMPLE 3

The houseboat assembly of any one of the previous or following Examples, wherein the control element is configured to electronically connect with the pod to facilitate electronic communication between the helm and the pod.

EXAMPLE 4

A system comprising: a houseboat assembly, wherein the houseboat assembly defines a pod slot; and a pod system comprising: a first pod, wherein the first pod is configured to fit in the pod slot, and a second pod, wherein the second pod includes a movement element, wherein the second pod is configured to fit in the pod slot.

EXAMPLE 5

The system of any one of the previous or following Examples, wherein the houseboat assembly includes a first connector disposed on the houseboat assembly proximate the pod slot, wherein the first connector is configured to secure the second pod in the pod slot.

EXAMPLE 6

The system of any one of the previous or following Examples, wherein the second pod includes a second connector, wherein the first connector and the second connector are configured to engage to secure the second pod in the pod slot.

EXAMPLE 7

The system of any one of the previous or following Examples, further comprising a removable element configured to connect first connector to second connector to secure the second pod in the pod slot.

EXAMPLE 8

The system of any one of the previous or following Examples, wherein the removable element is a cotter pin, a sliding bolt, or a D-ring.

EXAMPLE 9

The system of any one of the previous or following Examples, wherein the movement element includes a propeller powered or rotated by a power source.

EXAMPLE 10

The system of any one of the previous or following Examples, wherein the power source is disposed in the houseboat assembly.

EXAMPLE 11

The system of any one of the previous or following Examples, wherein the power source is disposed in the second pod.

EXAMPLE 12

The system of any one of the previous or following Examples, wherein the power source is a rechargeable battery.

EXAMPLE 13

The system of any one of the previous or following Examples, further comprising a solar panel, wherein the battery is recharged by the solar panel.

EXAMPLE 14

The system of any one of the previous or following Examples, wherein the movement element includes a stern thruster.

EXAMPLE 15

The system of any one of the previous or following Examples, wherein the houseboat assembly includes a bow thruster, and wherein the helm is configured to actuate the stern thruster and the bow thruster simultaneously when the second pod is secured within the pod slot.

EXAMPLE 16

A method comprising: removing a first pod from a pod slot defined by a houseboat assembly; securing a second pod in the pod slot; and actuating a movement element of the second pod to move the houseboat assembly.

EXAMPLE 17

The method of any of the previous or following Examples, further comprising connecting a helm of the houseboat assembly with the movement element when the second pod is secured in the pod slot.

EXAMPLE 18

The method of any of the previous or following Examples, further comprising manipulating the helm to actuate the movement element of the second pod.

EXAMPLE 19

The method of any of the previous or following Examples, wherein the movement element includes a stern thruster.

EXAMPLE 20

The method of any of the previous Examples, further comprising manipulating the helm to actuate the stern thruster and a bow thruster of the houseboat assembly simultaneously.

IV. Miscellaneous

It should be understood that any of the examples described herein may include various other features in addition to or in lieu of those described above. By way of example only, any of the examples described herein may also include one or more of the various features disclosed in any of the various references that are incorporated by reference herein.

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various versions of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, versions, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

I claim:

1. A system comprising:
   (a) a houseboat assembly, wherein the houseboat assembly defines a pod slot, wherein the houseboat assembly includes a first connector disposed on the houseboat assembly proximate the pod slot;
   (b) a pod system comprising:
      (i) a first pod, wherein the first pod is configured to fit in the pod slot, and
      (ii) a second pod, wherein the second pod includes a movement element, wherein the second pod is configured to fit in the pod slot, wherein the second pod includes a second connector; and
   (c) a removable element configured to connect first connector to second connector to secure the second pod in the pod slot.

2. The system of claim 1, wherein the removable element is a cotter pin.

3. The system of claim 1, wherein the movement element includes a propeller powered by a power source.

4. The system of claim 3, wherein the power source is disposed in the houseboat assembly.

5. The system of claim 3, wherein the power source is disposed in the second pod.

6. The system of claim 3, wherein the power source is a rechargeable battery.

7. The system of claim 6, further comprising a solar panel, wherein the battery is recharged by the solar panel.

8. The system of claim 1, wherein the movement element includes a stern thruster.

9. The system of claim 8, wherein the houseboat assembly includes a bow thruster, and wherein the helm is configured to actuate the stern thruster and the bow thruster simultaneously when the second pod is secured within the pod slot.

* * * * *